US012656471B2

(12) United States Patent
Brillon et al.

(10) Patent No.: US 12,656,471 B2
(45) Date of Patent: Jun. 16, 2026

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventors: Alain Brillon, Villeneuve-Tolosane (FR); Stéphane Charbonnier, Labarthe sur Leze (FR); Patrick Belenguer, Cornebarrieu (FR)

(73) Assignee: Continental Automotive Technologies GmbH, Hannover (DE)

( * ) Notice: Subject to any disclaimer, the term of this patent is extended or adjusted under 35 U.S.C. 154(b) by 42 days.

(21) Appl. No.: 18/771,258

(22) Filed: Jul. 12, 2024

(65) Prior Publication Data

US 2025/0067861 A1     Feb. 27, 2025

(30) Foreign Application Priority Data

Aug. 22, 2023    (FR) ....................................... 2308845

(51) Int. Cl.
| | |
|---|---|
| *G01S 13/02* | (2006.01) |
| *B60R 25/20* | (2013.01) |
| *H04W 4/40* | (2018.01) |

(52) U.S. Cl.
CPC ........ *G01S 13/0209* (2013.01); *B60R 25/209* (2013.01); *H04W 4/40* (2018.02); *B60R 2325/205* (2013.01)

(58) Field of Classification Search
CPC .... G01S 13/0209; G01S 13/931; G01S 7/006; G01S 13/765; B60R 25/209;
(Continued)

(56) References Cited

U.S. PATENT DOCUMENTS

| | | | |
|---|---|---|---|
| 2019/0048645 A1* | 2/2019 | Nakatomi | ............... E05B 81/76 |
| 2019/0300006 A1* | 10/2019 | Golsch | .................. B60R 16/037 |

(Continued)

FOREIGN PATENT DOCUMENTS

| | | | | |
|---|---|---|---|---|
| FR | 3128295 A1 * | 4/2023 | ........... | G01S 5/0273 |

OTHER PUBLICATIONS

Brillon Alain, Oct. 20, 2021 English Machine Translation_ FR3128295A1 provided by Patent Translate by EPO and Google (Year: 2021).*

(Continued)

*Primary Examiner* — Ashley L Redhead, Jr.
(74) *Attorney, Agent, or Firm* — Buchanan Ingersoll & Rooney PC

(57) ABSTRACT

A method for starting a motor vehicle by an activation device, from a user's portable device. The method includes: Detecting closure of the opening elements of the vehicle; Transmitting ultra-wideband waves into the passenger compartment; Receiving the waves and, for each transmitter module: i) Comparing a time-of-flight value with predetermined time-of-flight values, ii) Determining the presence of the portable device in the passenger compartment, iii) If the portable device is situated in the passenger compartment, then iv) Activating the vehicle function, and v) Comparing a received power value with predetermined received power values, vi) Determining the presence of the portable device in the passenger compartment: 1) If the portable device is not detected in the passenger compartment, then calculating a correction value between the received power and the predetermined received power, 2) The activation device storing the correction value for subsequent presence detection of the device in the passenger compartment.

10 Claims, 3 Drawing Sheets

(58) Field of Classification Search
CPC . B60R 2325/205; B60R 25/245; B60R 25/24;
B60R 2325/10; H04W 4/40; G07C
2209/63; G07C 9/00309
See application file for complete search history.

(56) References Cited

U.S. PATENT DOCUMENTS

| | | | |
|---|---|---|---|
| 2022/0012962 A1* | 1/2022 | Golgiri | G07C 9/00309 |
| 2022/0242370 A1* | 8/2022 | Oman | B60R 25/25 |
| 2023/0174013 A1* | 6/2023 | Ciocchetta | E05B 81/08 |
| | | | 340/5.72 |
| 2023/0373440 A1* | 11/2023 | Cheikh | B60R 25/245 |
| 2025/0388188 A1* | 12/2025 | Buttolo | B60R 25/24 |

OTHER PUBLICATIONS

RRP Notification with Response Obligation dated Mar. 15, 2024,
Preliminary Research Report dated Mar. 13, 2024, and Written
Opinion with English translation by the French Patent Office in
corresponding French Patent Application No. FR2308845. (24
pages).

* cited by examiner

METHOD FOR ACTIVATING A VEHICLE FUNCTION AND ASSOCIATED ACTIVATION DEVICE

CROSS REFERENCE TO RELATED APPLICATIONS

This application claims priority to French Patent Application No. 2308845, filed Aug. 22, 2023, the contents of such application being incorporated by reference herein.

FIELD OF THE INVENTION

The invention relates to a method for activating a function of a motor vehicle and an associated activation device. The invention applies particularly but entirely non-limitingly to the "hands-free" start function of the vehicle.

BACKGROUND OF THE INVENTION

In a motor vehicle, it is known practice to use vehicle function activation devices which can make it possible to start a vehicle "hands-free". By way of example, detecting the presence of an activation device inside the passenger compartment makes it possible to start the vehicle hands-free.

A "hands-free" access system for a motor vehicle makes it possible for an authorized user to lock and/or unlock the opening elements of their vehicle without having to physically press buttons on a key or to start their vehicle without having to insert a physical key into the Neiman® of their vehicle. For this purpose, the vehicle identifies a portable device such as a fob or remote control or even a key carried by the user, and, if the fob or the remote control or indeed the key is situated in a predetermined zone around the vehicle or in the vehicle and is identified as belonging to the vehicle, then the vehicle automatically locks/unlocks its opening elements or starts according to the intention of the user, without the user having to physically manipulate a key.

To achieve this, when the user approaches the vehicle, communication is established over a wireless communication link between the "hands-free" access device, for example an electronic fob or a smartphone, and the vehicle function activation device in order to authenticate said access device by virtue of its identifier.

To this end, the activation device comprises at least one radiofrequency antenna which makes it possible to receive the identifier sent by the "hands-free" access device. The activation device is connected to an electronic control unit (ECU) of the vehicle, to which it transmits the identifier.

According to the prior art, the access device is generally an electronic fob. The signal received by the antenna of the activation device, which comprises the identifier of the access device, is transmitted via RF (radiofrequency) or LF (low-frequency) waves. The portable device is located precisely around the vehicle or in the passenger compartment by measuring the intensity of the RF signal received by the portable device (via the antennas and the electronic control unit) from the vehicle, more commonly called RSSI (received signal strength indication) measurements. The measurement of the power of each signal received by the portable device from each antenna of the plurality of RF antennas which are situated on the vehicle V is received and analyzed by an activation device, installed in the vehicle, which thus determines, by triangulation, the position of the portable device with respect to said RF antennas, that is to say with respect to the vehicle.

According to the location of the portable device identified by the vehicle, in said location zones, certain actions which are specific to said location zones are performed automatically: unlocking/locking or starting the vehicle.

Nowadays, however, it is increasingly common to use a mobile phone to perform authentication functions, which makes it possible to avoid using a dedicated electronic fob and thus to limit the number of devices. The majority of mobile phones do not possess RF or LF communication means. It therefore becomes necessary to adapt the "hands-free" start and/or access system for a vehicle in order for it to be able also to operate with a mobile telephone equipped with other communication standards, such as, for example, ultra-wideband, or Bluetooth Low Energy®, or Wi-Fi (Wireless Fidelity) communication and no longer only via radio and low-frequency (RF and LF) waves. Ultra-wideband (UWB), in particular, is a radio modulation technique which is based on transmitting pulses of a very short duration, often less than a nanosecond. The bandwidth may thus reach very large values.

Bluetooth communication is, for its part, communication at a frequency in the region of 2.4 GHz.

The drawback of using Bluetooth (ultra-high frequency) lies in the imprecision of the location of the mobile telephone. Bluetooth is subject to a lot of interference, which makes the location imprecise. In addition, the location of the mobile telephone varies notably from one telephone to another.

It is, then, recommended to use ultra-wideband to locate the mobile telephone more precisely.

However, a major drawback of using the received power from waves transmitted by ultra-wideband lies in the wide dispersion of the received power values among the mobile telephones which are available on the market. This high variability of received power values can lead an activation device to locate a mobile telephone inside a vehicle when it is outside it and vice versa.

This poses obvious security problems as far as authorizing starting the vehicle is concerned.

One known solution from the prior art consists, then, in using the time of flight of the waves in order to locate the mobile telephone. Unfortunately, the time of flight is not a reliable parameter as it is subject to many reflections of the waves in the passenger compartment of the vehicle, or subject to obstacles, thus creating shadow zones where the time of flight cannot be used reliably.

An aspect of the invention therefore proposes a method for activating a vehicle function, the function being the starting of the vehicle, and an associated activation device making it possible to mitigate the drawbacks of the prior art, that is to say making it possible to locate an "hands-free" access device inside a vehicle precisely and reliably.

SUMMARY OF THE INVENTION

An aspect of the invention relates to a method for activating a function of a motor vehicle by means of an activation device, from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in the predetermined zone, of which an internal module is situated in a passenger compartment of the vehicle, the method comprising the following steps:

a. Detecting the closure of the opening elements of the vehicle, b. Transmitting ultra-wideband waves into the predetermined zone, c. Receiving the waves from the access device and, for each module:

i. Calculating a time-of-flight value for the waves thus received and comparing it with predetermined time-of-flight values, ii. Determining the presence of the portable device in the predetermined zone depending on the result of the comparison, iii. If the portable device is situated in said zone, then 1. Activating the vehicle function, and 2. Measuring and comparing a received power value for the waves with predetermined received power values, 3. Determining the presence of the portable device in the zone depending on the result of the comparison:

a. If the portable device is not detected in the zone, then calculating a correction value between the received power and the predetermined received power, b. The activation device storing said correction value associated with an identifier of the device for subsequent detection of the presence of the device in said zone.

Judiciously, the predetermined received power values are associated with predetermined time-of-flight values and a received power is compared with predetermined received powers depending on the previously calculated time of flight.

Advantageously, the predetermined received power values and the predetermined time-of-flight values are measured during a prior phase of calibration with a reference portable device situated in the predetermined zone.

An aspect of the invention also relates to a device for activating a function of a motor vehicle from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in said zone, of which an internal module is situated in a passenger compartment of the vehicle, the device (D) further comprising a. Means for detecting closure of the opening elements, b. Means for transmitting waves in the ultra-wideband into said zone and for receiving the waves from the device, c. Means for calculating a time-of-flight value for the waves and for comparing it with predetermined time-of-flight values, d. Means for determining the presence of the portable device in the zone depending on the result of the comparison, e. Means for activating the vehicle function depending on detection of the device in the zone, f. Means for measuring and for comparing a received power value for the waves with predetermined received power values, g. Means for determining the presence of the portable device in the zone depending on the result of the comparison, h. Means for calculating a correction value between the received power and the predetermined received power, i. Means for storing said correction value associated with the identifier of the device.

Judiciously, the predetermined received power values are associated with predetermined time-of-flight values and the means for comparing a received power with predetermined received powers draw the comparison depending on the previously calculated time of flight.

The predetermined received power values and the predetermined time-of-flight values are determined during a prior phase of calibration with a reference portable device situated in the zone.

An aspect of the invention also relates to a computer program product comprising program code instructions for executing the steps of the method according to any one of the features listed above when said program is executed on a computer.

And finally, an aspect of the invention applies to any motor vehicle which comprises an activation device according to any one of the features listed above.

BRIEF DESCRIPTION OF THE DRAWINGS

Other features and advantages of aspects of the invention will become more clearly apparent on reading the following description. It is purely illustrative and should be read with reference to the appended drawings, in which.

DETAILED DESCRIPTION OF EXEMPLARY EMBODIMENTS

Figure 1:
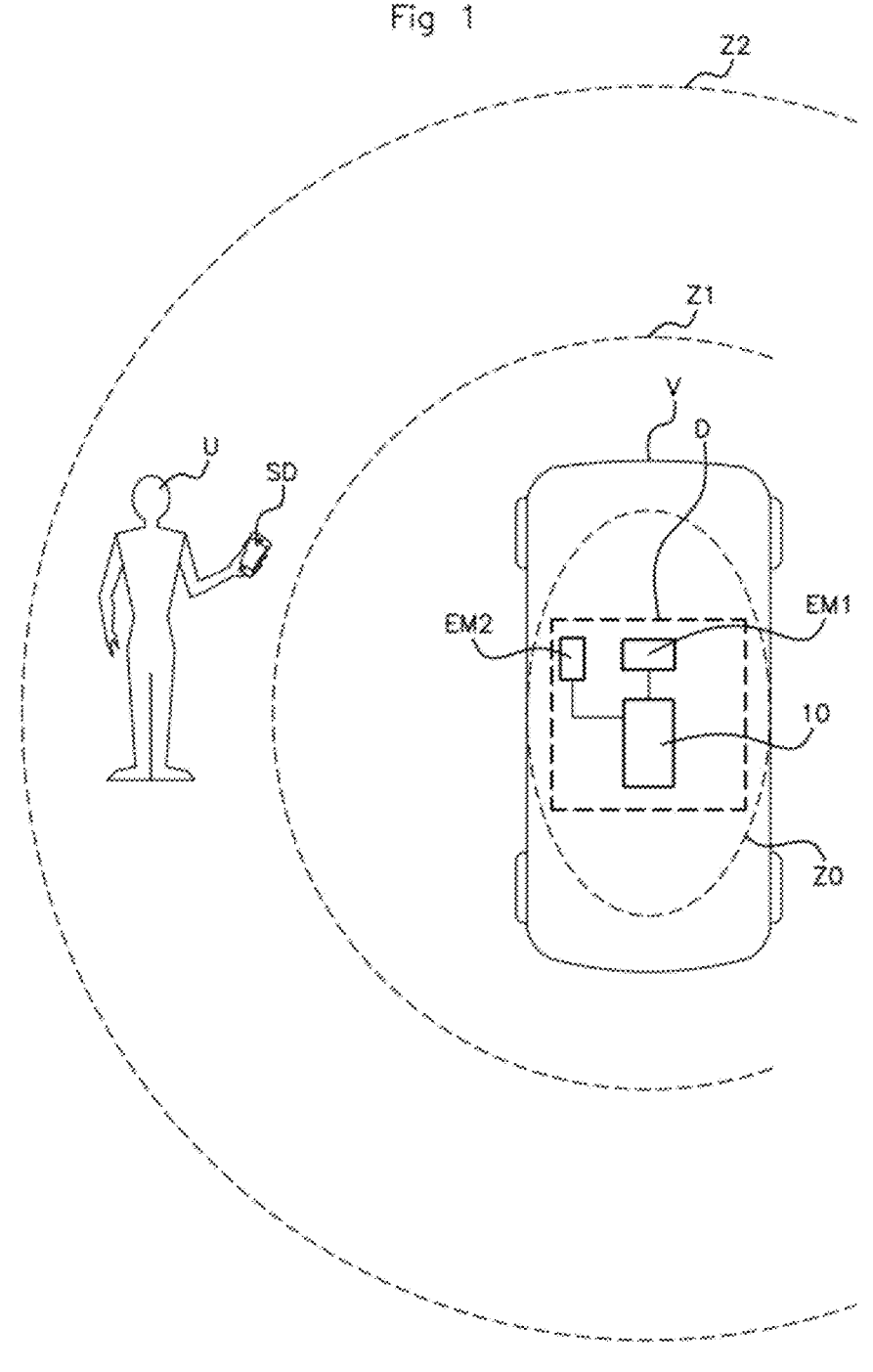
FIG. 1 is a schematic depiction of a vehicle equipped with an activation device according to an aspect of the invention.

FIG. 1 depicts a motor vehicle V equipped with the activation device D according to an aspect of the invention. The activation device D comprises at least two ultra-wideband (UWB) transceiver antenna modules EM1, EM2 which are able to communicate in the ultra-wideband with a portable access device SD carried by a user U in zones Z0, Z1, Z2 which are defined with respect to the vehicle V, of which at least one internal module EM1 is able to communicate with the device when it is inside the vehicle in an internal zone Z0.

The activation device D further comprises a central control unit 10 electronically connected to the two UWB modules EM1, EM2.

This central control unit 10 makes it possible to manage the transmission and the reception of the data in the UWB, via the modules. This is known from the prior art and will not be described in more detail here.

What is meant by ultra-wideband (UWB) communication is radiofrequency communication which is based on transmitting pulses of a very short duration, often less than a nanosecond. The bandwidth may thus reach very large values between 250 and 500 MHz.

As explained above, the location of the access device SD in the passenger compartment of the vehicle V using the power value RSSI (received signal strength indication) received by the device and transmitted to the antenna modules EM1, EM2 is imprecise and unreliable in this case because of the high variation in said received power value between different access devices.

An aspect of the invention proposes an activation method and device making it possible to remedy this drawback and making reliable and precise location inside the vehicle V possible.

With this aim, the activation device D according to an aspect of the invention comprises:

a. Means M1 for detecting closure of the opening elements, b. Means M2 for transmitting waves in the ultra-wideband into the vehicle V and for receiving the waves from the device SD in return, c. Means M3 for calculating a time-of-flight value TOF for the waves thus received and for comparing it with predetermined time-of-flight values TOFd, d. Means M4 for determining the presence of the portable device SD inside the vehicle V depending on the result of the comparison, e. Means M5 for activating the vehicle function depending on detection of the device SD inside the vehicle V, f. Means M6 for measuring and for comparing a received power value RSSI for said waves with a predetermined received power value RSSId, g. Means M7 for determining the presence of the portable device SD inside the vehicle depending on the result of the comparison, h. Means M8 for calculating a correction value ΔRSSI between the received power RSSI and the predetermined received power RSSId, i. Means M9 for storing said correction value ΔRSSI associated with an identifier ID of the device SD.

Figure 2:
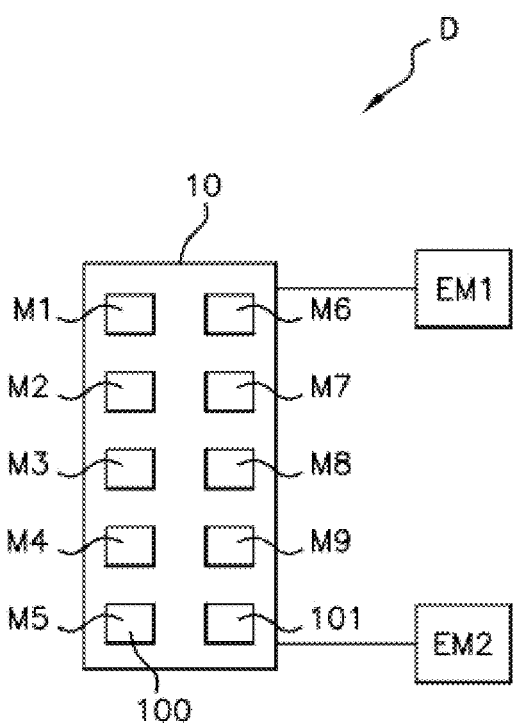
FIG. 2 is a schematic depiction of the activation device according to an aspect of the invention.

The detection means M1, the transmission means M2, the calculation and comparison means M3, the determination means M4, the means M5 for activating the function, the comparison means M6, the determination means M7, the incrementation or decrementation means M8 and the storage means M9 are preferably in the form of software contained in an integrated circuit of the central control unit 10 (cf. FIG. 2).

The central control unit 10 also comprises a processor 100 and a memory 101 (cf. FIG. 2) in which instructions are stored which make it possible to configure the processor to execute certain particular processing operations, notably to implement the steps of the activation method, according to the embodiment as is described below.

The means M1 for detecting the opening elements make it possible to detect that all the opening elements of the vehicle are closed before triggering the transmission of the UWB waves by the modules EM1, EM2.

The means M2 for transmitting UWB waves into the vehicle V and for receiving the waves from the portable access device SD are known to a person skilled in the art and will not be described in more detail here. It is important to note that, according to an aspect of the invention, once the opening elements have been closed, the two modules EM1, EM2 are able to transmit waves which propagate through the internal zone Z0 (i.e. passenger compartment) of the vehicle V.

The means M3 for calculating the time of flight determine a time of flight TOF for the waves between them being transmitted and them being received by the modules EM1, EM2; the times of flight TOF thus make it possible to calculate a distance d separating each module EM1, EM2 from the portable access device SD; specifically, the time of flight TOF is correlated directly with said distance d by the propagation speed of the waves, which is the speed of light. This is known from the prior art.

For each module EM1, EM2, by comparing the times of flight TOF with predetermined time-of-flight values TOFd, which were previously measured with the access device SD situated in the passenger compartment, it is thus possible to know whether the portable device SD is in the passenger compartment or outside the vehicle V. Preferably but non-limitingly, in a good embodiment of the invention the internal module EM1 is situated so as to be centered in the passenger compartment. The determination means M4 thus make it possible to conclude whether or not the portable device SD is present in the passenger compartment.

The means M5 for activating the vehicle function trigger the starting of the vehicle, if the device SD was detected in the passenger compartment Z0 after the times of flight TOF, TOFd have been compared.

Likewise, according to an aspect of the invention, it is proposed to measure, for each module EM1, EM2, by virtue of the measurement and comparison means M6, the power RSSI received by the access device SD when it receives the waves transmitted from said modules EM1, EM2 and to compare, for each module EM1, EM2, said power measurement RSSI with a predetermined received power value RSSId.

Said predetermined received power values RSSId were measured previously during a phase of calibration by virtue of a reference portable device SD0 situated in the passenger compartment and which has, for example, the maximum received power characteristic, that is to say the maximum radiofrequency power; the other portable devices then have a lower power and will be located less well, which makes it possible to avoid false detections outside the vehicle V. Preferably, during this calibration phase, for each position of the reference access device SD0 in the passenger compartment, a time of flight TOFd and a received power RSSId were measured for each module EM1, EM2. Thus the pair of received power and time-of-flight values (RSSId, TOFd) per module EM1, EM2 makes it possible to locate the access device SD in the passenger compartment precisely.

According to an aspect of the invention, the received power RSSI is compared with a predetermined received power value RSSId which corresponds to the time of flight TOF of the previously measured pair RSSId, TOFd.

The received power RSSI is, like the time of flight TOF, an indicator which makes it possible to know whether the access device SD is inside the passenger compartment, the received power RSSI also being correlated with the distance d separating each internal module EM1, EM2 of the access device SD and the internal configuration of the passenger compartment (presence of obstacles, etc.).

However, as the received power RSSI varies non-negligibly between different portable devices, this indicator in itself is not reliable.

In the case where the received power RSSI from the access device SD corresponds to the predetermined value RSSId, that is to say to that of the reference portable device SD0, then the comparison results in a received power difference ΔRSSI between the two values which is equal to zero and the determination means M7 conclude that the portable device SD is in the passenger compartment Z0. The received power characteristics for the portable device correspond, in this case, to those for the reference portable device SD0.

By contrast, if the received power RSSI from the portable device SD differs from the predetermined value RSSId from the reference device SD0, for example if said value RSSI is higher or lower than the predetermined value RSSId, the comparison does not make it possible to conclude that the access device SD is in the passenger compartment. The received power characteristics for the portable device SD then differ from those for the reference portable device SD0.

In this case, according to an aspect of the invention the means M8 for calculating a correction value ΔRSSI increase or decrease the received power value RSSI from the portable device SD so that the difference between the two values is equal to zero, that is to say that said means M8 compensate for the received power value RSSI from the access device SD in order for it to be equal to the predetermined value RSSId from the reference access device SD0.

Once the two values are equal, RSSI=RSSId, the storage means M9 store, for example in the memory 101 of the central unit 10, the value of said correction ΔRSSI=RSSI– RSSId, that is to say of the incrementation or of the decrementation which was necessary, associating it with the identifier ID of the access device SD (which will have been exchanged previously during the ultra-wideband communication).

Once the correction value ΔRSSI has been stored, said correction value will be applied automatically during future communication between the activation device D, whatever the transceiver module EM1, EM2, and the access device SD (once it has been recognized by virtue of its identifier ID), in order to subsequently locate said device SD in the passenger compartment Z0 precisely. The correction value ΔRSSI is then applied to all the received power values RSSI from said device SD.

Figure 3:
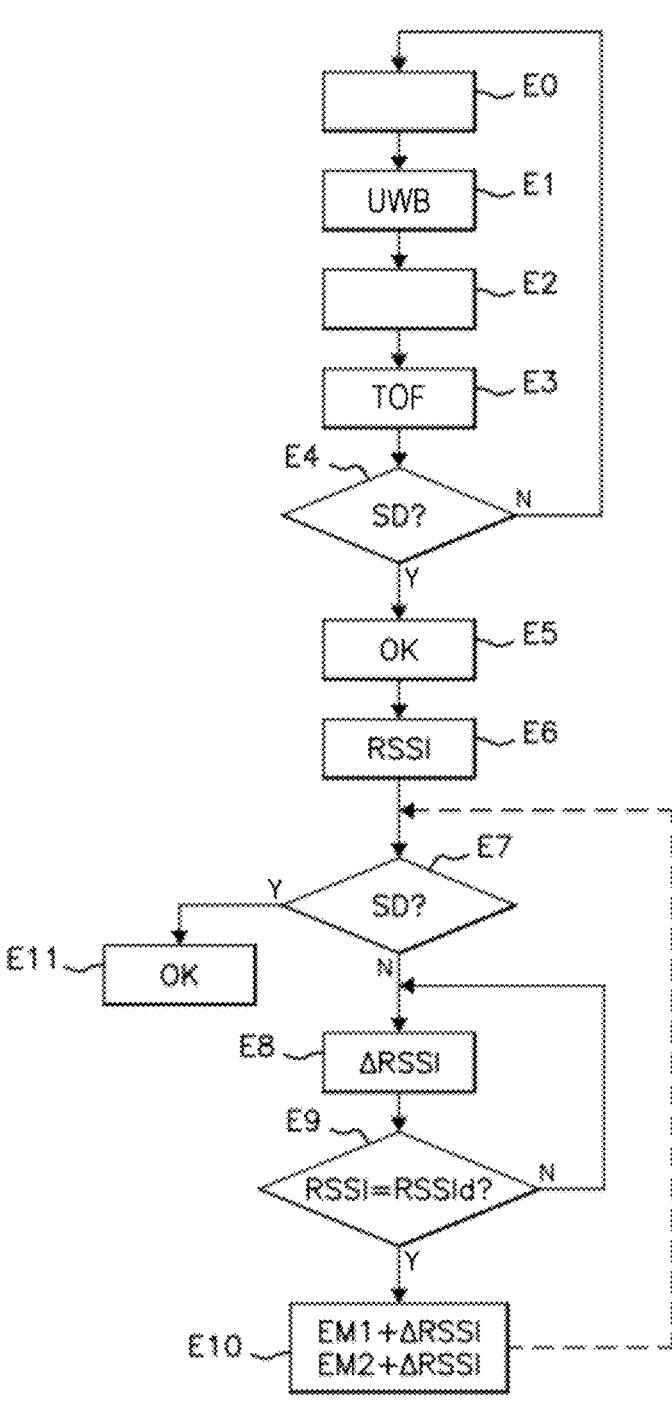
FIG. 3 is a flowchart illustrating the activation method according to an aspect of the invention.

The activation method, illustrated in FIG. 3, will now be described.

In a prior step E0, it is checked that all the opening elements of the vehicle V are closed.

Then, in a first step E1, the modules EM1, EM2 transmit waves into the passenger compartment of the vehicle V. Said waves are received by the access device SD which is inside the vehicle V then are sent by said device SD to said modules EM1, EM2.

The waves are then received during a second step E2 by the activation device D via the modules EM1, EM2.

During a third step E3, a return time of flight TOF for the waves is then calculated for each module EM1, EM2.

During the fourth step E4, it is determined whether the access device SD is situated inside the vehicle V by comparing, for each module, the times of flight TOF thus measured with time-of-flight values TOFd which were predetermined during a prior calibration phase and are representative of a reference access device SD0 situated in the passenger compartment.

Specifically, during this prior calibration phase, a position of the access device SD0 in the passenger compartment is associated with each pair of a predetermined time-of-flight value TOFd and a received power value RSSId. The time of flight is a precise indicator of the location of the access device SD; however, it is subject to reflections and attenuations and is not enough by itself to determine the location of the access device SD in the whole internal zone Z0. Likewise, the received power RSSI is not enough in itself to locate the portable device. However, the applicant has observed that, by associating the two parameters RSSI, TOF it is possible to improve the precision and reliability of the location considerably.

If the access device SD is located in the passenger compartment Z0, then the vehicle V function is activated (step E5), here the starting of the vehicle V, and according to an aspect of the invention, in contrast to the prior art, the activation method continues as follows.

In the sixth step E6, the power RSSI received by the portable device SD is measured and compared, for each module EM1, EM2, with a predetermined received power value RSSId corresponding to the previously determined time of flight TOF.

During the seventh step E7, if the received power value corresponds to the predetermined received power value RSSId, the determination means M7 conclude that the access device SD is inside the passenger compartment Z0 and the vehicle function is then activated (step E11).

If the received power value RSSI does not correspond to the predetermined received power value RSSId, then the calculation means M8 determine, for each module EM1, EM2, a correction value ΔRSSI (step E8), which may be either an incrementation or a decrementation of the received power RSSI in order for it to be equal to the predetermined received power value RSSId. Of course, this decrementation or incrementation can be performed step by step, in steps of +1 dB or of –1 dB. This step is repeated until the received power value RSSI is equal to the predetermined received power value RSSId (step E9). The gap ΔRSSI between the measured received power RSSI and the predetermined received power RSSId is different between the two modules EM1, EM2. The modules EM1, EM2 can therefore be corrected differently and each have a specific correction value ΔRSSI.

When the two values are equal (step E9), RSSI=RSSId, then, during the tenth step E10, the storage means M9 of the activation device D store, in its memory, the correction value ΔRSSI for each module EM1, EM2 associated with the identifier ID of the portable device SD.

Thus, for all future communication between the activation device D and the identified portable device SD, the activation device D will correct all the received power values RSSI by applying a correction value ΔRSSI which is specific to each module EM1, EM2.

An aspect of the invention is particularly ingenious as it is easy to implement and transparent for the user, and thus makes it possible to locate the access device in the passenger compartment of the vehicle reliably and robustly, thus making the start function of the vehicle secure.

The invention claimed is:

1. A method for activating a function of a motor vehicle by means of an activation device, from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in the predetermined zone, of which an internal module is situated in a passenger compartment of the vehicle, the method comprising:

a) Detecting the closure of the opening elements of the vehicle, b) Transmitting ultra-wideband waves into the predetermined zone, c) Receiving the waves from the access device and, for each module:

i) Calculating a time-of-flight value for the waves thus received and comparing it with predetermined time-of-flight values, ii) Determining the presence of the portable device in the predetermined zone depending on the result of the comparison, iii) If the portable device is situated in said zone, then 1) Activating the vehicle function, and 2) Measuring and comparing a received power value for the waves with predetermined received power values, 3) Determining the presence of the portable device in the zone depending on the result of the comparison:

a. If the portable device is not detected in the zone, then calculating a correction value between the received power and the predetermined received power, b. The activation device storing said correction value associated with an identifier of the device for subsequent detection of the presence of the device in said zone, c. Applying said correction value to all the received power values from said device, d. Locating said device in the passenger compartment depending on the received power thus corrected.

2. The activation method as claimed in claim 1, wherein the predetermined received power values are associated with predetermined time-of-flight values and wherein a received power is compared with predetermined received powers depending on the previously calculated time of flight corresponding to the predetermined time of flight.

3. The activation method as claimed in claim 2, wherein the predetermined received power values and the predetermined time-of-flight values are measured during a prior phase of calibration with a reference portable device situated in the predetermined zone.

4. A computer program product comprising program code instructions for executing the steps of the method as claimed in claim 1 when said program is executed on a computer.

5. A method for activating a function of a motor vehicle by means of an activation device, from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in the predetermined zone, of which an internal module is situated in a passenger compartment of the vehicle, the method comprising:

a) Detecting the closure of the opening elements of the vehicle, b) Transmitting ultra-wideband waves into the predetermined zone, c) Receiving the waves from the access device and, for each module:

i) Calculating a time-of-flight value for the waves thus received and comparing it with predetermined time-of-flight values, ii) Determining the presence of the portable device in the predetermined zone depending on the result of the comparison, iii) If the portable device is situated in said zone, then 1) Activating the vehicle function, and 2) Measuring and comparing a received power value for the waves with predetermined received power values, 3) Determining the presence of the portable device in the zone depending on the result of the comparison:

a. If the portable device is not detected in the zone, then calculating a correction value between the received power and the predetermined received power, b. The activation device storing said correction value associated with an identifier of the device for subsequent detection of the presence of the device in said zone, c. Applying said correction value to all the received power values from said device, d. Locating said device in the passenger compartment depending on the received power thus corrected, wherein the predetermined received power values and the predetermined time-of-flight values are measured during a prior phase of calibration with a reference portable device situated in the predetermined zone.

6. A device for activating a function of a motor vehicle from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in said zone, of which an internal module is situated in a passenger compartment of the vehicle, wherein the device further comprises a) Means for detecting closure of the opening elements, b) Means for transmitting waves in the ultra-wideband into said zone and for receiving the waves from the device, c) Means for calculating a time-of-flight value for the waves and for comparing it with predetermined time-of-flight values, d) Means for determining the presence of the portable device in the zone depending on the result of the comparison with predetermined time-of-flight values, e) Means for activating the vehicle function depending on detection of the device in the zone, f) Means for measuring and for comparing a received power value for the waves with predetermined received power values, g) Means for determining the presence of the portable device in the zone depending on the result of the comparison with predetermined received power values, h) Means for calculating a correction value between the received power and the predetermined received power, i) Means for storing said correction value associated with the identifier of the device.

7. The activation device as claimed claim 6, wherein the predetermined received power values are associated with predetermined time-of-flight values and wherein the means for comparing a received power with predetermined received powers draw the comparison depending on the previously calculated time of flight corresponding to the predetermined time of flight.

8. The activation device as claimed in claim 7, wherein it further comprises received power values and time-of-flight values which were predetermined during a prior phase of calibration with a reference portable device situated in the zone.

9. A motor vehicle, comprising an activation device as claimed in claim 6.

10. A device for activating a function of a motor vehicle from a portable "hands-free" access device carried by a user, the activation of the function being triggered by detection of the presence of the user in a predetermined zone with respect to the vehicle, and depending on a result of authentication of the "hands-free" access device by the vehicle, the activation device comprising at least two ultra-wideband transceiver modules which are able to communicate with said device in the ultra-wideband in said zone, of which an internal module is situated in a passenger compartment of the vehicle, wherein the device further comprises a) Means for detecting closure of the opening elements, b) Means for transmitting waves in the ultra-wideband into said zone and for receiving the waves from the device, c) Means for calculating a time-of-flight value for the waves and for comparing it with predetermined time-of-flight values, d) Means for determining the presence of the portable device in the zone depending on the result of the comparison with predetermined time-of-flight values, e) Means for activating the vehicle function depending on detection of the device in the zone, f) Means for measuring and for comparing a received power value for the waves with predetermined received power values, g) Means for determining the presence of the portable device in the zone depending on the result of the comparison with predetermined received power values, h) Means for calculating a correction value between the received power and the predetermined received power, i) Means for storing said correction value associated with the identifier of the device, wherein the activation device further comprises received power values and time-of-flight values which were predetermined during a prior phase of calibration with a reference portable device situated in the zone.

\* \* \* \* \*